United States Patent
Mednik

(10) Patent No.: US 10,348,205 B1
(45) Date of Patent: Jul. 9, 2019

(54) COUPLED-INDUCTOR CASCADED BUCK CONVERTER WITH FAST TRANSIENT RESPONSE

(71) Applicant: Microchip Technology Incorporated, Chandler, AZ (US)

(72) Inventor: Alexander Mednik, Campbell, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/045,158

(22) Filed: Jul. 25, 2018

Related U.S. Application Data

(60) Provisional application No. 62/643,558, filed on Mar. 15, 2018.

(51) Int. Cl.
 G05F 1/46 (2006.01)
 H02M 3/158 (2006.01)
 H02M 1/00 (2006.01)

(52) U.S. Cl.
 CPC .... H02M 3/1582 (2013.01); *H02M 2001/007* (2013.01)

(58) Field of Classification Search
 CPC .................. H02M 1/34; H02M 3/158; H02M 2001/0064; Y02B 70/1491
 USPC ............... 323/222, 224, 270, 282, 284, 290; 363/16–17, 65
 See application file for complete search history.

(56) References Cited

U.S. PATENT DOCUMENTS 6,008,631 A * 12/1999 Johari ................... H02M 3/158
 323/222
6,822,427 B2 * 11/2004 Wittenbreder .......... H02M 1/34
 323/222
7,919,953 B2 * 4/2011 Porter ....................... G05F 5/00
 323/222
8,659,281 B2 * 2/2014 Tong .......................... G06F 1/26
 323/285
9,036,372 B2 * 5/2015 Worek ................ H02M 3/3376
 363/16
9,755,513 B2 * 9/2017 Friebe ................... H02M 3/158

(Continued)

OTHER PUBLICATIONS

Liang Tsorng-Juu et al: Analysis, Design and Implementation of a Bidirectional Double-Boost DC-DC Converter, IEEE Transactions on Industry Applications, IEE Service Center, Piscataway, NJ, US, vol. 50, No. 6, Nov. 1, 2014 (Nov. 1, 2014), pp. 3955-3962, XP011564520, ISSN: 0093-9994, DOI: 10.1109/TIA.2014.2315504[retrieved on Nov. 18, 2014] p. 3956; figure 3, p. 3957-p. 3960; figures 7-11.

(Continued)

*Primary Examiner* — Rajnikant B Patel

(74) *Attorney, Agent, or Firm* — Burr & Forman LLP; Jeffrey H. Kamenetsky

(57) ABSTRACT

A cascaded buck converter for receiving input voltage from an input voltage source and for delivering output voltage to a load. The converter includes a first inductor, a second inductor, a coupled inductor having a first winding connected in series with the first inductor and a second winding connected in series with the second inductor, an intermediate decoupling capacitor for receiving energy from the first inductor and the first winding and for supplying energy to the second inductor and the second winding, and an output decoupling capacitor for smoothening the output voltage at the load.

17 Claims, 3 Drawing Sheets

(56) References Cited

U.S. PATENT DOCUMENTS

2010/0246230 A1* 9/2010 Porter .................. G05F 5/00
                                                      363/131
2012/0126888 A1* 5/2012 Ikriannikov .......... B06B 1/0261
                                                       330/69

OTHER PUBLICATIONS

Aguilar-Najar Ricardo et al: "Cascaded Buck Converter: A Rexamination" 2016 IEEE Transportation Electrification Conference and Expo (ITEC), IEEE, Jun. 27, 2016 (Jun. 27, 2016), pp. 1-5, XP032929031, DOI: 10.1109/ITEC.2016.7520211 [retrieved on Jul. 22, 2016] the whole document.

* cited by examiner

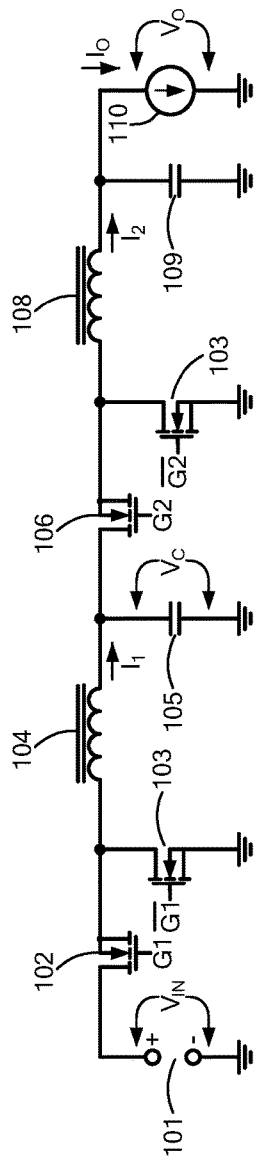
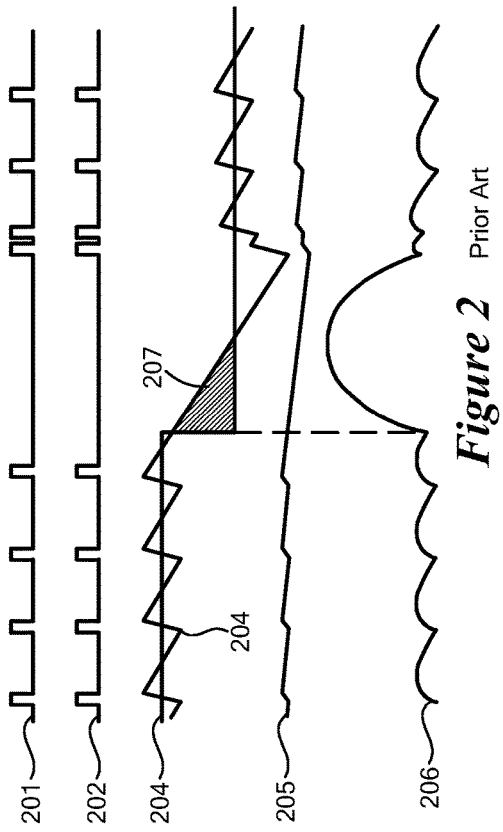
*Figure 1* Prior Art
*Figure 2* Prior Art

US 10,348,205 B1

COUPLED-INDUCTOR CASCADED BUCK CONVERTER WITH FAST TRANSIENT RESPONSE

CROSS-REFERENCE TO RELATED APPLICATION

This application claims the benefit of U.S. Provisional Patent Application No. 62/643,558, filed on Mar. 15, 2018, which is incorporated herein by reference in its entirety.

TECHNICAL FIELD

The present disclosure generally relates to power topology circuits and more particularly to a coupled-inductor cascaded buck converter with a fast transient response.

BACKGROUND

Increasing energy consumption in data centers needs improvement with regard to power efficiencies. This requirement has triggered development of power topologies capable of direct power conversion from 48V to the point-of-load (PoL) voltage in numerous markets such as telecommunications, industrial, aerospace, and server environments. One attempted solution is transformer-based using a resonant/non-resonant half-bridge/full bridge plus a current doubler. Another attempted solution is the use of buck converters. Non-isolated buck converters have drawn the most attention for this application due to their inherent high efficiency and fast transient response. However, high step-down voltage conversion ratios imply a very low duty cycle, which difficult to implement in a single-stage buck converter. In order to overcome this problem, the industry is employing the emerging Gallium nitride (GaN) field-effect transistor technology capable of nanosecond switching times. Alternatively, cascaded buck converters are utilized, developing intermediate bus voltages and maintaining reasonable duty cycles achievable using silicon metal-oxide-semiconductor field-effect transistors (MOSFETs).

Both of the above-mentioned solutions suffer from a problem with a load release transient in the output voltage. Indeed, due to a very low output voltage, achievable current slew rate in the output filter inductor is low, i.e., $-V_O/L$. Therefore, a very large access charge needs to be absorbed by the output capacitor, and a large output capacitor is required to prevent an overshoot of output voltage.

FIG. 1 depicts a prior-art cascaded buck converter receiving an input supply voltage $V_{IN}$ from an input source 101 and converting it to a low output voltage $V_O$ at a load 110. The cascaded converter includes an input buck converter stage including a first high-side switch 102, a first low-side switch 103, a first inductor 104, and an intermediate decoupling capacitor 105, an output buck converter stage including a second high-side switch 106, a second low-side switch 107, a second inductor 108, and an output decoupling capacitor 109. Intermediate decoupling capacitor 105 develops an intermediate bus voltage $V_C$. First high-side switch 102 and first low-side switch 103 receive the gate drive signals G1 and $\overline{G1}$. Second high-side switch 106 and second low-side switch 107 receive gate drive signals G2 and $\overline{G2}$. First inductor 104 and second inductor 108 conduct currents $I_1$ and $I_2$ correspondingly. The output load 110 conducts output current $I_O$.

FIG. 2 shows exemplary waveforms illustrating the prior art converter of FIG. 1 operated in constant on-time (COT) mode, without limiting the generality of the deficiencies it suffers in other control modes. Both buck converter stages are operated synchronously, and the waveforms 201 and 202 represent the gate drive signals G1 and G2 correspondingly. The waveforms 203, 204, and 205 depict the currents $I_2$, $I_1$, and $I_O$ correspondingly. A step in the current 203 leaves residual energy in second inductor 108 that needs to be absorbed by output decoupling capacitor 109. As is depicted in FIG. 2, the converter of FIG. 1 is operated with small duty cycle, i.e., $d=\sqrt{V_O/V_{in}}\ll 1$ and an intermediate bus voltage according to $V_C=\sqrt{V_{in}V_O}$. Accordingly, the down-slope slew rate $dI_2/dt=-V_O/L_2$ is much slower than the rising slope $dI_2/dt=(V_C-V_O)/L_2$. Hence, the load release transient of the output current $I_O$ leaves an asymmetrically larger excess charge 207 in second inductor 108. This charge 207 causes a large overshoot of the output voltage $V_O$ seen in the waveform 206. The cascaded buck converters shown in FIGS. 1 and 2 operate at high step-down voltage ratios, resulting in an asymmetrically poor response to a load release transient.

Similar behavior causes an undershoot in the voltage 206 when the current 203 steps up. However, the issue is less severe due to the faster rising slope of the current 204.

Hence, a new power topology and a new control method are needed which are capable of a faster response to a load release transient for the 48V-to-PoL conversion.

SUMMARY

According to one aspect of the disclosure, a cascaded buck converter for receiving input voltage from an input voltage source and for delivering output voltage to a load is provided. The converter includes a first inductor, a second inductor, a coupled inductor having a first winding connected in series with the first inductor and a second winding connected in series with the second inductor, an intermediate decoupling capacitor for receiving energy from the first inductor and the first winding and for supplying energy to the second inductor and the second winding, and an output decoupling capacitor for smoothening the output voltage at the load.

BRIEF DESCRIPTION OF DRAWINGS

A more complete understanding of the present embodiments, and the attendant advantages and features thereof, will be more readily understood by reference to the following detailed description when considered in conjunction with the accompanying drawings wherein:

FIG. 1 is a circuit diagram of a prior art cascaded buck converter;

FIG. 2 is a waveform diagram showing waveforms of the prior art converter of FIG. 1;

DETAILED DESCRIPTION OF EXEMPLARY EMBODIMENTS

Figure 3:
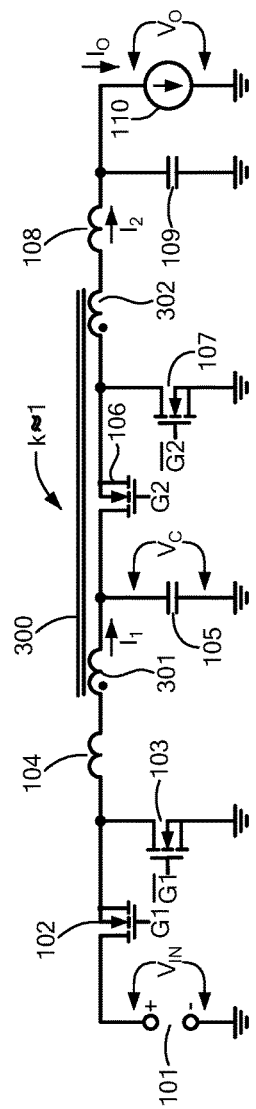
FIG. 3 is a circuit diagram of a cascaded buck converter in accordance with an embodiment of the present disclosure.

FIG. 3 depicts a cascaded buck converter of the present disclosure where a coupled inductor 300 is added to the circuitry, where coupled inductor 300 includes an input winding 301 and an output winding 302, with a turn ratio n and a coupling coefficient between input winding 301 and output winding 302. The windings 301 and 302 are connected in series with first inductor 104 and second inductor 108 correspondingly, and both windings are connected in the same polarity facing the load 110. To avoid excessive ripple steering, n≈1/d (duty cycle)=√Vin/Vo is selected. A control pulse (shown in FIG. 4) is applied at G1 upon output voltage $V_O$ exceeding a threshold voltage $V_{ON}$, while G2=0.

According to an embodiment of the present disclosure, first high-side switch 102 is configured to energize first inductor 104 and a first winding, i.e., input winding 301, from an input voltage source 101. A first low-side switch 103 is configured to de-energize first inductor 104 and first winding 301 by connecting them across an intermediate decoupling capacitor 105. A second high-side switch 106 is configured to energize second inductor 108 and second winding 302 by connecting them across an output decoupling capacitor 109. A second low-side switch 107 is configured to de-energize second inductor 108 and second winding 302 by connecting them across output decoupling capacitor 109. First high-side switch 102 and second high-side switch 106 are activated substantially synchronously and first low-side switch 103 and second low-side switch 107 are also activated substantially synchronously.

Figure 4:
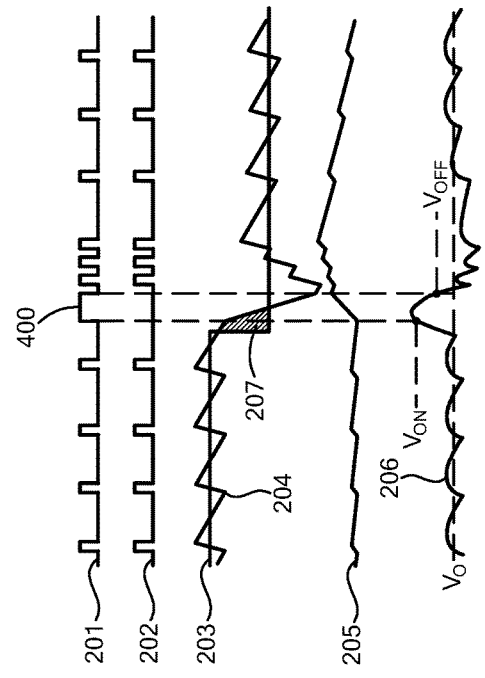
FIG. 4 is a waveform diagram showing waveforms of the cascaded buck converter of FIG. 3.

FIG. 4 illustrates operation of the converter of FIG. 3. Referring to the waveform 201, first high-side switch 102 provides a gate signal that produces a pulse 400 following the load release step in 203. The pulse 400 turns first high-side switch 102 on and first low-side switch 103 off. Under this condition, a voltage $V_2$ of negative polarity appears across second inductor 108. Without loss of generality, it can be assumed that $L_2=L_1/n^2=L_S$ for the sake of simplicity, where $L_1$ is the inductance of first inductor 104, and $L_2$ is inductance of second inductor 108. Then, solving for the voltage across second inductor 108:

$$V_2 = -\frac{V_g \cdot Z_m + V_O \cdot (Z_m + Z_S)}{2Z_m + Z_S}$$

where $V_g=(V_{IN}-V_C)/n$, $Z_S=s \cdot L_S$, and $Z_m=s \cdot L_m$. Here, $L_m$ is inductance of the output winding 302. The voltage $V_2$ can be made significantly greater than $V_O$, and the current 204 starts slewing down at a much greater rate, i.e., $-V_2/L_2$. Accordingly, the current 205 increases at a slew rate $[V_{IN}-V_C-n \cdot (V_2-V_O)]/L_1$. The current $I_2$ (as shown in FIG. 3) becomes quickly diverted into the input winding 301, and the excess charge 207 delivered to output decoupling capacitor 109 becomes minimal.

Therefore, the load-release overshoot in the output voltage 206 is reduced. The excess energy stored in first inductor 104 and coupled inductor 300 is further absorbed by intermediate decoupling capacitor 105. The corresponding overshoot in $V_C$ (shown in FIG. 3) is further rejected by a control loop regulating the output voltage $V_O$, and therefore it has minimal effect on $V_O$.

FIG. 4 also illustrates an exemplary control method of the converter of FIG. 3 without loss of generality of the approach. The gate drive signal is activated, generating a pulse 400 when the output voltage $V_O$ exceeds a threshold $V_{ON}$. The pulse 400 is terminated when $V_O$ falls below a threshold $V_{OFF}$ that is equal to or lower than $V_{ON}$. Therefore, the current 204 can be said to reverse its direction by the end of the pulse 400, and the output voltage $V_O$ quickly settles in the vicinity of its programmed magnitude with optimal selection of $V_{OFF}$. First high-side switch 102 and second low-side switch 107 are activated concurrently when the output voltage $V_O$ exceeds a first threshold. First high-side switch 102 is deactivated when the output voltage $V_O$ falls below a second threshold.

Figure 5:
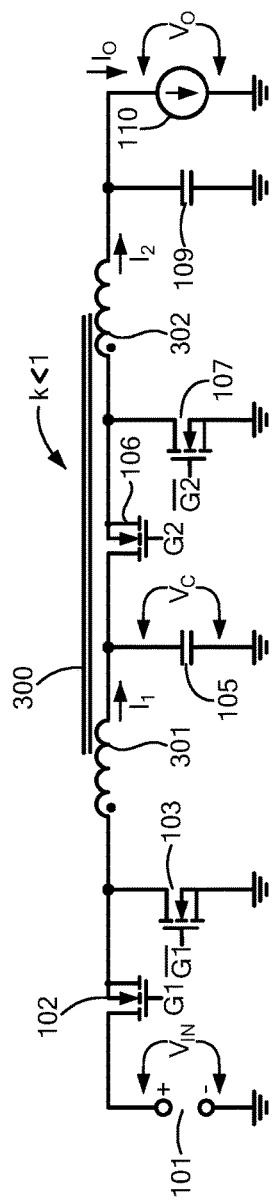
FIG. 5 is a circuit diagram illustrating an alternate embodiment of the cascaded buck converter of the present disclosure.

FIG. 5 depicts another embodiment of the present disclosure, where the coupling coefficient k between input winding 301 and output winding 302 of coupled inductor 300 is less than 1. The resulting leakage inductances of the winding 301 and 302 are utilized as the first inductor 104 and the second inductor 108 of the converter of FIG. 3. One skilled in the art can understand that the converters of FIGS. 3 and 5 are two extreme implementations of the preferred embodiment, and a practical design can make use of both the leakage inductance of coupled inductor 300 and the first inductor 104 and second inductor 108.

In one embodiment, first inductor 104 is contributed partially by the leakage inductance of input winding 301 of coupled inductor 300. In one embodiment, first inductor 104 is contributed entirely by the leakage inductance of input winding 301 of coupled inductor 300. In another embodiment, second inductor 108 is contributed partially by the leakage inductance of second winding 302 of coupled inductor 300. In another embodiment, second inductor 108 is contributed entirely by the leakage inductance of second winding 302 of coupled inductor 300.

Figure 6:
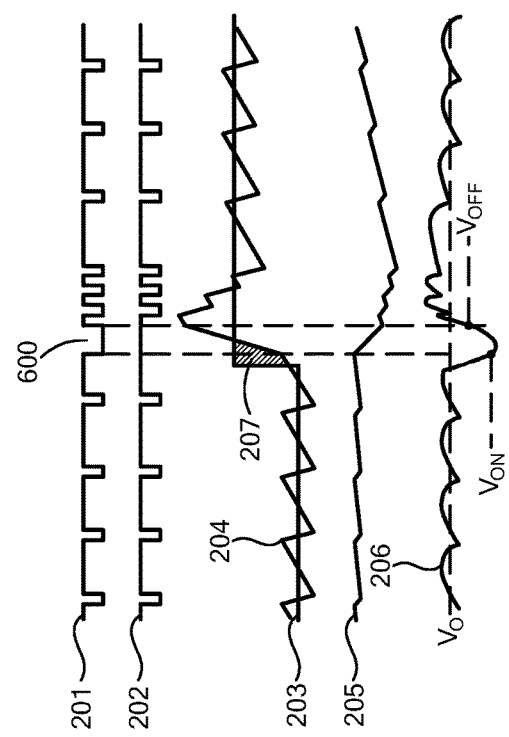
FIG. 6 is a waveform diagram showing waveforms of the cascaded buck converter of FIG. 3.

Wherever it is useful, the apparatus and method of the present disclosed may be applied to the opposite case, i.e. to speed up the positive load step response and reduce the corresponding undershoot. FIG. 6 illustrates this aspect of the disclosure. In this embodiment, gate signal G1 produces a turn-off pulse 600 following the load step, leading to a fast increase in the current 204 and the corresponding fast decrease in the current 205. In this embodiment, first low-side switch 103 and second high-side switch 106 are activated concurrently when the output voltage $V_O$ falls below a third threshold. First low-side switch 103 is deactivated when the output voltage $V_O$ exceeds a fourth threshold.

In one embodiment, a cascaded buck converter for receiving input voltage from an input voltage source and for delivering output voltage to a load is provided. The converter includes first inductor 104, second inductor 108, coupled inductor 300 having first winding 301 connected in series with first inductor 104 and a second winding 302 connected in series with second inductor 108, intermediate decoupling capacitor 105 for receiving energy from first inductor 104 and first winding 301 and for supplying energy to second inductor 108 and second winding 302, and output decoupling capacitor 109 for smoothening the output voltage at load 110.

In one embodiment, the cascaded buck converter further includes first high-side switch 102 for energizing first inductor 104 and first winding 301 from input voltage source 101, first low-side switch 103 for de-energizing first inductor 104 and first winding 301 by connecting them across intermediate decoupling capacitor 105, second high-side switch 106 for energizing second inductor 108 and second winding 302 from intermediate decoupling capacitor 105, and second low-side switch 107 for de-energizing second inductor 108 and second winding 302 by connecting them across output decoupling capacitor 109, wherein first high-side switch 102 and second high-side switch 106 are activated substantially synchronously, and wherein first low-side switch 103 and second low-side switch 107 are activated substantially synchronously.

In another embodiment, first inductor 104 is contributed partially by leakage inductance of first winding 301 of coupled inductor 300.

In another embodiment, first inductor 104 is contributed entirely by leakage inductance of first winding 301 of coupled inductor 300.

In another embodiment, second inductor 108 is contributed partially by leakage inductance of second winding 302 of coupled inductor 300.

In another embodiment, second inductor 108 is contributed entirely by leakage inductance of second winding 302 of coupled inductor 300.

In another embodiment, first high-side switch 102 and second low-side switch 107 are activated concurrently when the output voltage exceeds a first threshold.

In another embodiment, first high-side switch 102 is deactivated when the output voltage falls below a second threshold.

In another embodiment, first low-side switch 103 and second high-side switch 106 are activated concurrently when the output voltage falls below a third threshold.

In another embodiment, first low-side switch 103 is deactivated when the output voltage exceeds a forth threshold.

In another embodiment, a coupling coefficient between first winding 301 and second winding 302 is equal to 1.

In another embodiment, a coupling coefficient between first winding 301 and second winding 302 is less than 1.

In another embodiment, leakage inductances of first winding 301 and second winding 302 are utilized as first inductor 104 and second inductor 108.

In another embodiment, intermediate decoupling capacitor 105 is configured to absorb excess energy stored in first inductor 104 and coupled inductor 300.

In another embodiment, first winding 301 and second winding 302 have a turn ratio substantially equal to the reciprocal of a duty cycle of cascaded buck converter 300.

What is claimed is:

1. A cascaded buck converter for receiving input voltage from an input voltage source and for delivering output voltage to a load, the converter comprising:
    a first inductor;
    a second inductor;
    a coupled inductor having a first winding connected in series with the first inductor and a second winding connected in series with the second inductor;
    an intermediate decoupling capacitor for receiving energy from the first inductor and the first winding and for supplying energy to the second inductor and the second winding; and
    an output decoupling capacitor for smoothening the output voltage at the load.

2. The cascaded buck converter of claim 1, further comprising:
    a first high-side switch for energizing the first inductor and the first winding from the input voltage source;
    a first low-side switch for de-energizing the first inductor and the first winding by connecting them across the intermediate decoupling capacitor;
    a second high-side switch for energizing the second inductor and the second winding from the intermediate decoupling capacitor; and
    a second low-side switch for de-energizing the second inductor and the second winding by connecting them across the output decoupling capacitor,
    wherein the first high-side switch and the second high-side switch are activated substantially synchronously, and wherein the first low-side switch and the second low-side switch are activated substantially synchronously.

3. The cascaded buck converter of claim 1, wherein the first inductor is contributed partially by leakage inductance of the first winding of the coupled inductor.

4. The cascaded buck converter of claim 1, wherein the first inductor is contributed entirely by leakage inductance of the first winding of the coupled inductor.

5. The cascaded buck converter of claim 1, wherein the second inductor is contributed partially by leakage inductance of the second winding of the coupled inductor.

6. The cascaded buck converter of claim 1, wherein the second inductor is contributed entirely by leakage inductance of the second winding of the coupled inductor.

7. The cascaded buck converter of claim 1, wherein a coupling coefficient between the first winding and the second winding is substantially equal to 1.

8. The cascaded buck converter of claim 1, wherein a coupling coefficient between the first winding and the second winding is less than 1.

9. The cascaded buck converter of claim 1, wherein the intermediate decoupling capacitor is configured to absorb excess energy stored in the first inductor and the coupled inductor.

10. The cascaded buck converter of claim 1, wherein the first winding and the second winding have a turn ratio substantially equal to the reciprocal of a duty cycle of the cascaded buck converter.

11. The cascaded buck converter of claim 2, wherein the first high-side switch and the second low-side switch are activated concurrently.

12. The cascaded buck converter of claim 11, wherein the first high-side switch is deactivated when the output voltage falls below a second threshold.

13. The cascaded buck converter of claim 2, wherein the first low-side switch and the second high-side switch are activated concurrently.

14. The cascaded buck converter of claim 13, wherein the first low-side switch is deactivated when the output voltage exceeds a forth threshold.

15. The cascaded buck converter of claim 8, wherein leakage inductances of the first winding and the second winding are utilized as the first inductor and the second inductor.

16. The cascaded buck converter of claim 11, wherein the first high-side switch and the second low-side switch are activated concurrently when the output voltage exceeds a first threshold.

17. The cascaded buck converter of claim 13, wherein the first low-side switch and the second high-side switch are activated concurrently when the output voltage falls below a third threshold.

* * * * *